(12) United States Patent
Nakatsuka

(10) Patent No.: US 6,504,540 B1
(45) Date of Patent: *Jan. 7, 2003

(54) METHOD AND APPARATUS FOR ALTERING ONE OR MORE ATTRIBUTES OF ONE OR MORE BLOCKS OF IMAGE DATA IN A DOCUMENT

(75) Inventor: Tadanori Nakatsuka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/666,600

(22) Filed: Jun. 18, 1996

(30) Foreign Application Priority Data

Jun. 19, 1995 (JP) ............................................. 7-151490
Jun. 19, 1995 (JP) ............................................. 7-151492
Jun. 19, 1995 (JP) ............................................. 7-151493

(51) Int. Cl.[7] ............................................. G06T 11/00
(52) U.S. Cl. ..................................................... 345/433
(58) Field of Search ................................. 395/133, 118, 395/137, 326, 339, 347, 348–351, 352, 353, 354; 345/433, 418, 437, 326, 339, 347, 348–354

(56) References Cited

U.S. PATENT DOCUMENTS

| 4,984,152 A | 1/1991 | Muller ......................... 364/200 |
| 5,253,054 A | 10/1993 | Fujiwara et al. ............ 358/133 |

FOREIGN PATENT DOCUMENTS

| EP | 0 427 108 | 5/1991 |
| EP | 0 562 787 | 9/1993 |
| EP | 0 631 443 | 12/1994 |
| JP | 61-92073 | 5/1986 |
| JP | 3-106126 | 5/1991 |
| JP | 3-144864 | 6/1991 |
| JP | 4-57489 | 2/1992 |
| JP | 4-297184 | 10/1992 |
| JP | 6-90441 | 3/1994 |
| WO | 92/09173 | 5/1992 |
| WO | 94/00949 | 1/1994 |

OTHER PUBLICATIONS

Rice "Using a Scanner For Optical Character Recognition (OCR)", Jan. 13, 1995.*
"Omnipage Professional" Tutorials, 1993.*
CorelDRAW User's Manual, Version 3.0, Corel Corp., 1992, p. 26 and p. 115.
M. Balestri, et al., "A General Architecture Of Video Codec For Real Time Communication at 64 kbits/s", Signal Processing Image Communication, vol. 1, No. 2, Oct. 1, 1989, pp.239–243.

(List continued on next page.)

Primary Examiner—Almis R. Jankus
(74) Attorney, Agent, or Firm—Fitzpatrick, Cella, Harper & Scinto

(57) ABSTRACT

The invention relates to an image processing method and apparatus capable of making easy to designate and change attributes of a plurality of blocks contained in input image information. As an original image is input from an input unit, a plurality of blocks contained in the image are extracted, an attribute such as text typesetting for each extracted block is judged, and the judged result is displayed. The display data includes an input image, frame information capable of discriminating an extracted block, and attribute information of each block. The attribute information may be displayed in the form of symbol pattern. An operator selects a block at least whose attribute is to be changed or corrected by using a pointing device or the like, to thereby obtain a changed or corrected attribute. Attribute change or correction is performed for a plurality of designated blocks at the same time.

27 Claims, 9 Drawing Sheets

OTHER PUBLICATIONS

M. Barbero, et al., "DCT Source Coding And Current Implementations For HDTV", EBU Technical Review, No. 251, Spring 1992, pp. 22–33.

N. Mukawa, et al., "Temporal Subsampling Methods In TV Signal Interframe Coding", Review Of The Electrical Communication Laboratories, vol. 32, No. 3, 1984, pp. 508–516.

J. Waltrich, "Digital Video Compression—An Overview", Journal Of Lightwave Technology, vol. 11, No. 1, Jan. 1993, pp. 70–73.

* cited by examiner

METHOD AND APPARATUS FOR ALTERING ONE OR MORE ATTRIBUTES OF ONE OR MORE BLOCKS OF IMAGE DATA IN A DOCUMENT

BACKGROUND OF THE INVENTION

1. Field of the Invention

The present invention relates to an image processing method and apparatus capable of changing attributes of image data. The invention also relates to an image processing method and apparatus for determining the attribute of an input image.

2. Related Background Art

In a character recognition apparatus, a character area or block is extracted from a document image input from an image scanner or the like, and a character recognition process is performed after it is checked whether the attribute (horizontal writing, vertical writing, and the like) is incorrect or after an operator designates an attribute of each character block.

If there are a number of character blocks and an operator designates the attribute of each block, the work required by an operator becomes complicated and very cumbersome.

SUMMARY OF THE INVENTION

According to the invention, since a correction of an image attribute automatically judged can be performed with simple operations, a correct image attribute can be easily set.

According to the invention, since a correction can be performed collectively for a plurality of subjects, the correction work becomes easy.

According to the invention, irrespective of the types of initial attributes automatically judged, the attributes of a plurality of subjects can be designated by the common operation so that a correction work environment easy to be understood by a user can be provided.

According to the invention, the attribute of an image is represented by a symbol pattern. Therefore, a large amount of information can be displayed on a small number of display areas and an environment that a user can grasp an attribute easily and sensitively.

According to the invention, a character recognition starts after the image attribute is corrected so that a recognition rate is improved.

DETAILED DESCRIPTION OF THE PREFERRED EMBODIMENTS (First Embodiment)

<Description of Character Recognition (FIG. 1)>

Figure 1:
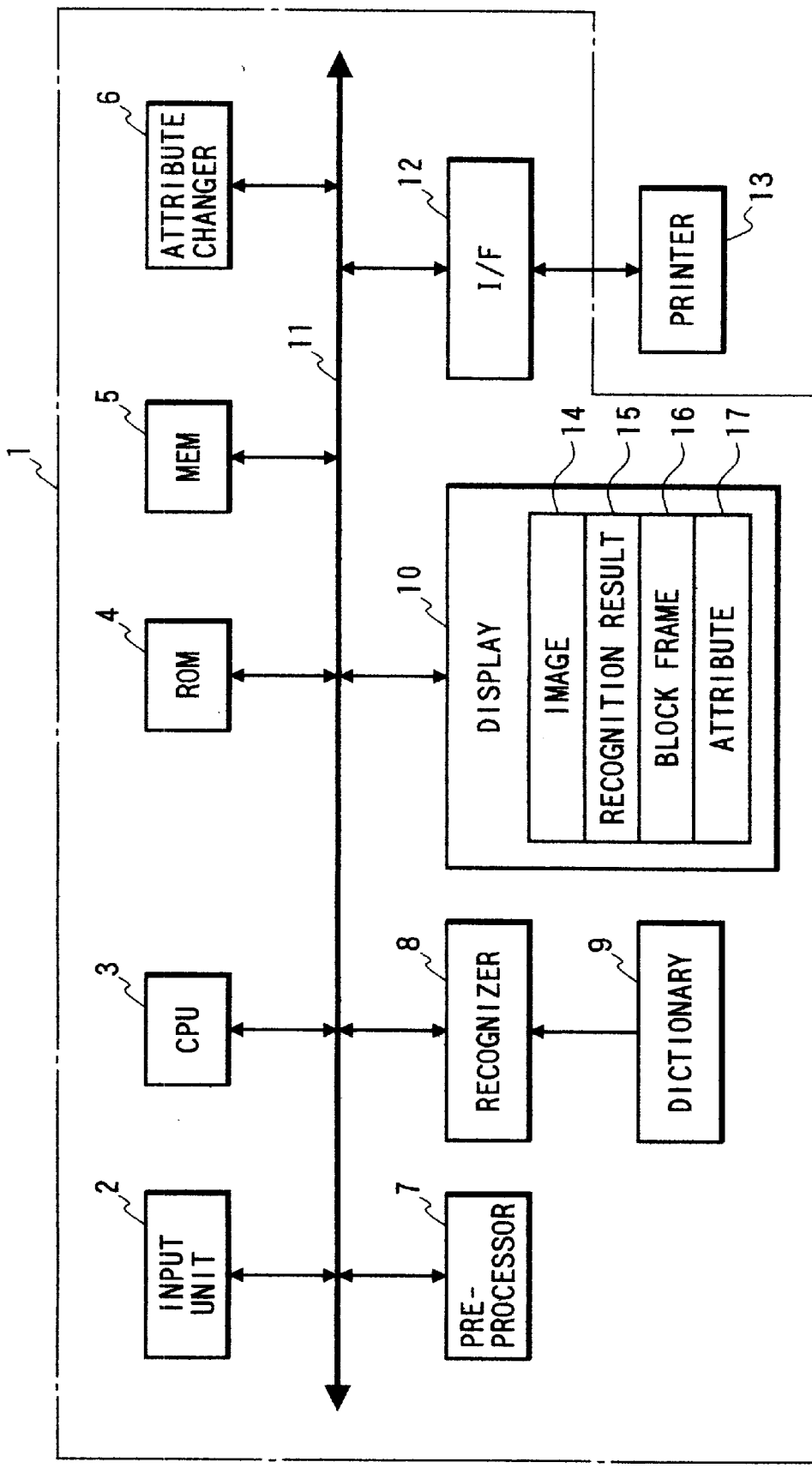
FIG. 1 is a block diagram showing the outline of the structure of a character recognition apparatus according to a first embodiment.

FIG. 1 is a block diagram showing the outline of the structure of a character recognition apparatus according to the first to third embodiments of the invention. In FIG. 1, reference numeral 1 represents a character recognition apparatus, and reference numeral 2 represents an input unit for reading a document image of an original and inputting it. The input unit 2 is a scanner or the like and inputs original image data in the form of digital data. The input unit 2 may not have a scanner and receives image data read by a scanner of another apparatus and transmitted via communication means such as a public telephone line. Reference numeral 3 represents a central processing unit (hereinafter called a CPU) for controlling the whole system of the apparatus 1 and performing computation and processing data. CPU 3 executes the processes of the embodiments in accordance with a control program stored in a ROM 4 or a memory 5. ROM 4 stores, for example, a control program for the processes of flow charts shown in FIG. 3 and following Figures, and various types of data. The memory (RAM) is used as the working area of CPU 3, and has an area for storing document image data input from the input unit 2, an area for storing the position and size of a character pattern extracted by a preprocessor 7, and an area for storing an area of an image to be recognized, i.e., block frame coordinate values or for downloading a control program stored in a storage medium such as a removable CD-ROM and FD. Reference numeral 6 represents an attribute changer which selects a block and changes an attribute by clicking a corresponding block symbol (which will be detailed later) with an unrepresented pointing device or the like. The preprocessor 7 extracts one character pattern of a document image stored in the memory 5. Reference numeral 8 represents a recognizer for extracting geometrical characteristics from a pattern preprocessed by the preprocessor 7, and matching them with standard patterns stored in advance in a dictionary 9 to recognize a character in the document image. Reference numeral 10 represents a display which is constituted by an image display area 14 for displaying an input document image, a recognition result display area 15, a block frame display area 16, and an attribute display area 17. Reference numeral 11 represents a system bus including a data bus and an address but to and from CPU 3, a control signal bus, and the like. Reference numeral 12 represents an external output unit with an interface unit for controlling interface with a printer 13 or the like.

With the apparatus constructed as above, an original image is input from the input unit 2 and stored in the memory 5. In addition to the stored image data, a reduced image is generated on the memory 5. For example, the reduced image uses as its one pixel a pixel block of n×n of the original image. If an n×n pixel block contains even one black pixel, a black pixel is set to the reduced pixel. With this process, the original image is reduced by 1/n in vertical and horizontal directions and the consecutive character images (dot images of character patterns) are coupled together.

A rectangle contacting the contour of this coupled dot distribution is sequentially defined to divide the image into blocks. In accordance with the size of a block obtained through a block division process and the number of black pixels contained in the block, most attributes (character, image, vertical or horizontal writing of characters, and so on) of a block to be processed can be judged.

In this embodiment, the block division process is assumed to be executed in the above-described manner. The block division process is not limited thereto and also the attribute judging process is not limited to the above-described process.

<Description of Image Window (FIG. 2)>

Figure 2:
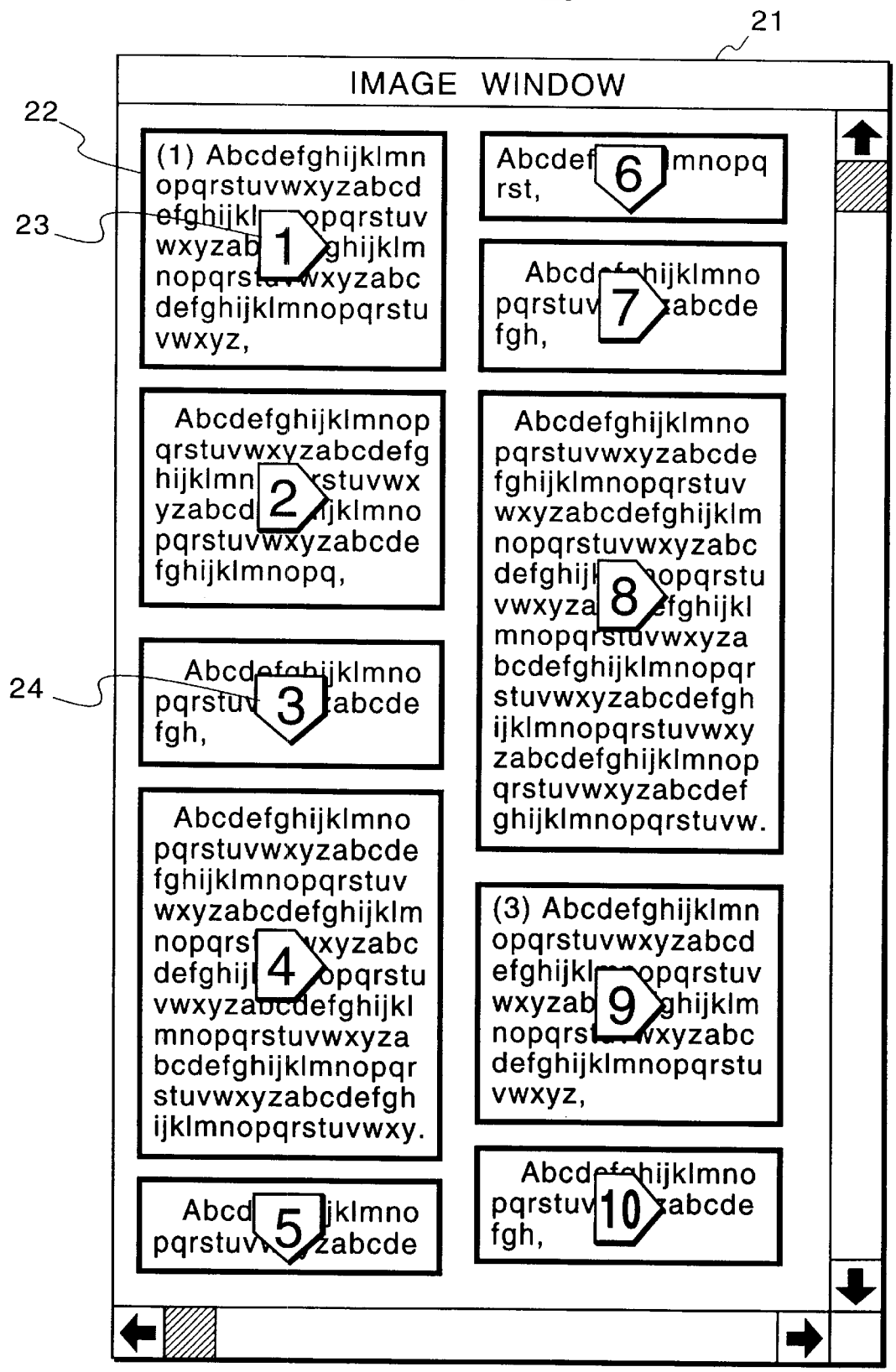
FIG. 2 is a diagram showing a display screen and a menu of the character recognition apparatus of the first embodiment.

FIG. 2 shows an example of an image window showing a document image (stored in the memory 5) input to the character recognition apparatus 1 of this embodiment, block division results, and block attributes.

In FIG. 2, reference numeral 21 represents an image window for displaying a document image read by the input unit 2. Reference numeral 22 represents a frame (defining the size of one block) obtained through block division, the frame indicating of one paragraph. Reference numerals 23 and 24 represent a block symbol indicating the attribute of each block. The block symbol 23 directing right indicates a judgement that the paragraph in the block frame is horizontal writing. A numeral 1 in the block symbol is a serial number indicating the character recognition order. The block symbol 24 indicates that this block is vertical writing.

In other words, FIG. 2 indicates that some paragraphs in blocks are judged as vertical writing, although all blocks are to be judged correctly as horizontal writing.

In this embodiment, the erroneously judged attributes are collectively corrected or designated.

The character recognition process of this embodiment will be described with reference to the flow chart shown in FIG. 3. A control program for executing this process is being stored in ROM 4 or in the memory 5.

First, at Step S31, the image of a document set by an operator is read with the input unit 2 (scanner) and stored in the memory 5.

Next, at Step S32, block division is performed. With this block division, paragraphs, graphic images, tables, ruled lines, and the like are identified.

At Step S33, the attribute of each block is judged and the result is stored in the memory 5. The attribute is displayed in the attribute display area in the form of block symbol.

At Step S34, the attribute of each block is corrected with a mouse or the like. At Step S35, character recognition is performed using the corrected attribute. Lastly, at Step S36, the recognition results is displayed.

Figure 3:
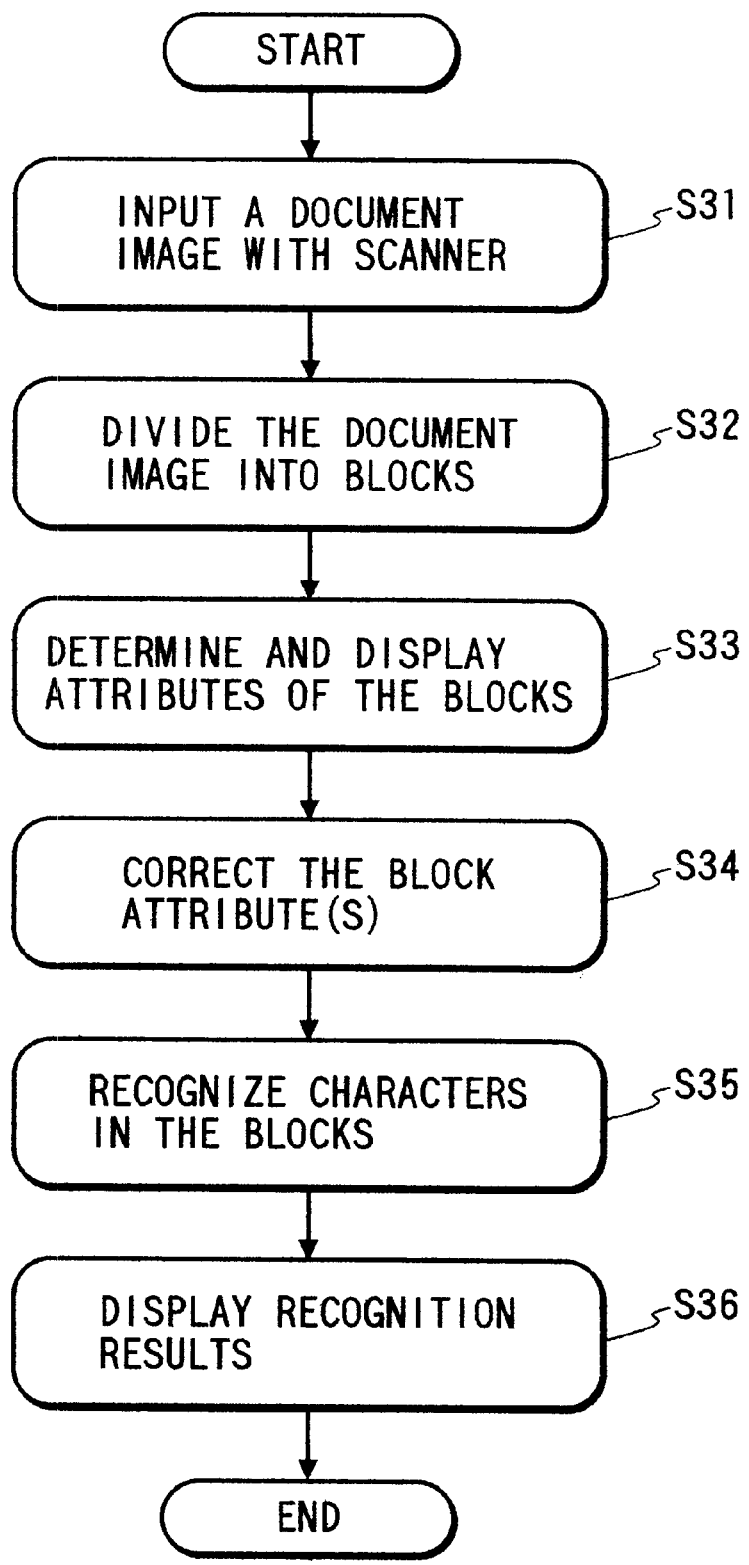
FIG. 3 is a flow chart illustrating the processes to be executed by the character recognition apparatus of the first embodiment.
Figure 4:
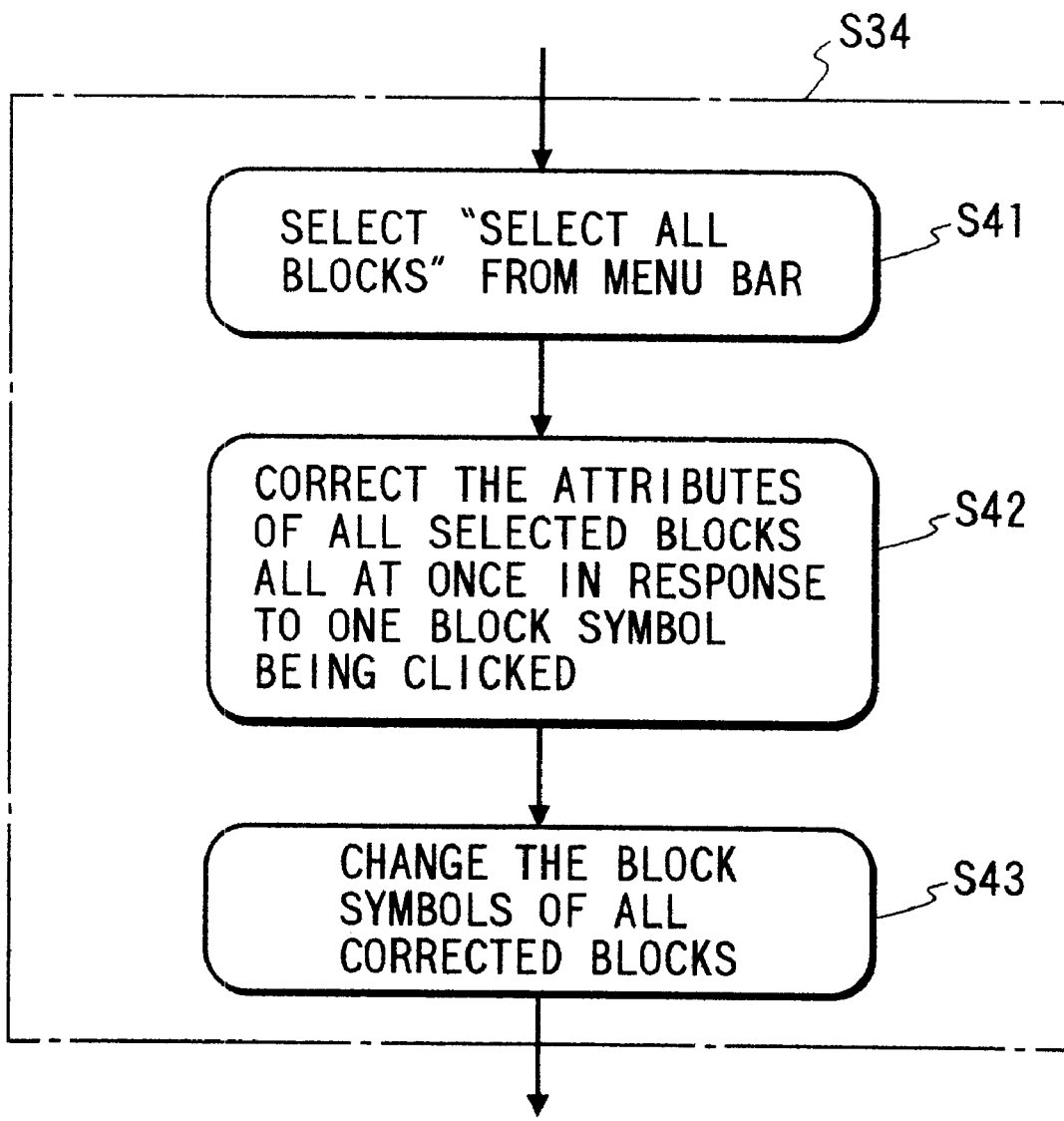
FIG. 4 is a flow chart illustrating the details of Step S34 shown in FIG. 3.

FIG. 4 is a flow chart illustrating the image display process at Step S34 in FIG. 3.

Figure 5:
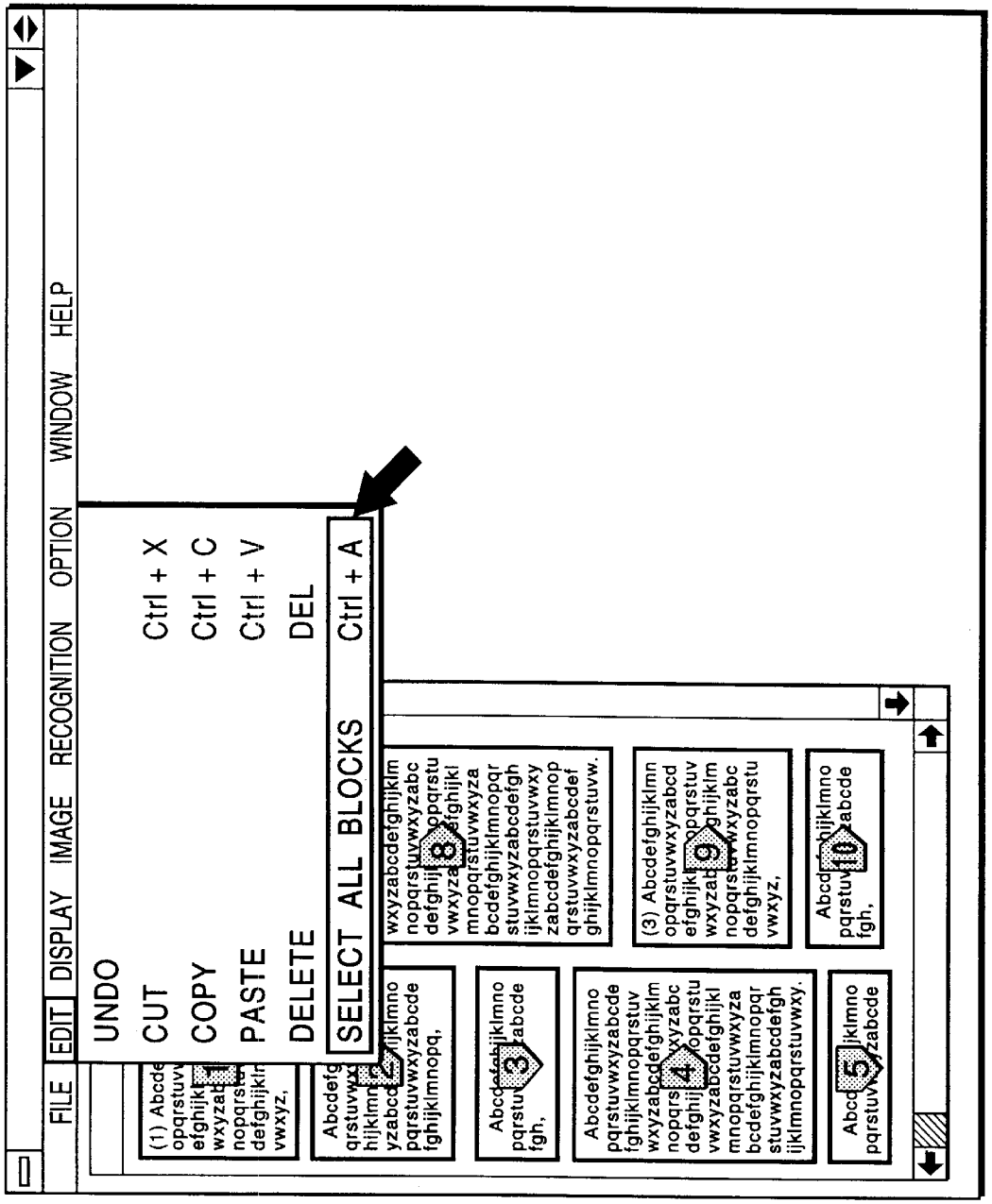
FIG. 5 is a diagram showing a display screen and a menu of the character recognition apparatus of the first embodiment.
Figure 6:
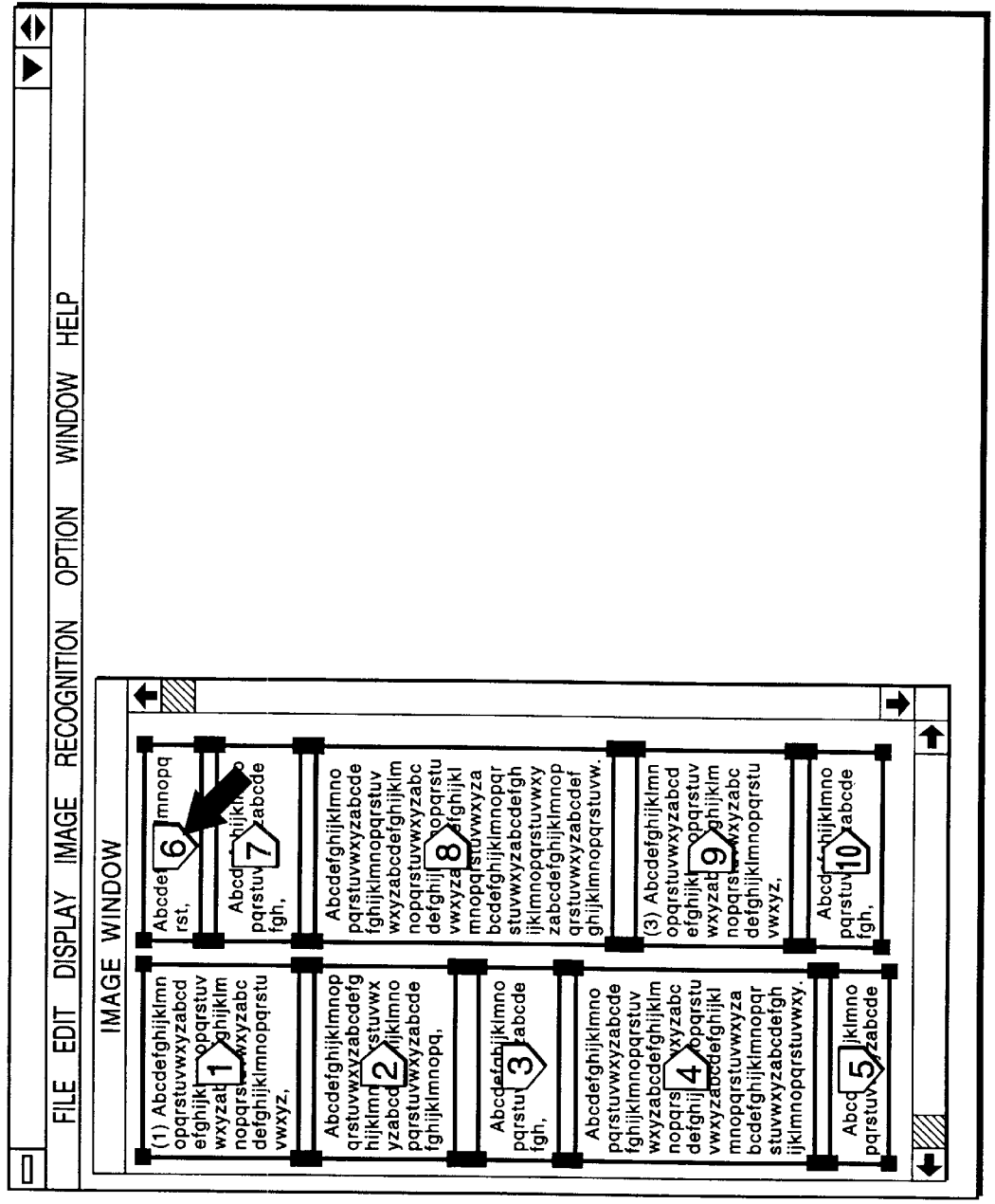
FIG. 6 is a diagram showing a display screen and a menu of the character recognition apparatus of the first embodiment.

First, at Step S41, a plurality of block frames are selected. In this embodiment, for example, as shown in FIG. 5, an "edit" pull-down menu in a menu bar displayed at the upper portion of the display screen is displayed by clicking the pointing device, and thereafter "Select All Block Frames" is designated so that the attributes of all block frames in the image window can be designated as edit candidates. Grey square signs are formed at the four corners of a selected block frame as shown in FIG. 6 to discriminate between selected and non-selected block frames. In this example, all block frames are selected.

Next, at Step S42, one block symbol is clicked with the pointing device or mouse so that the attributes of all the selected blocks can be corrected at the same time and changed to the attribute of the clicked block symbol. For example, as shown in FIG. 6, the third, fifth, and sixth block frames are erroneously judged as vertical writing in typesetting. In this case, when one of the third, fifth, and sixth block frames is clicked, the block attribute, in this case, typesetting, can be changed from vertical writing to horizontal writing. At this time, the attributes of all the selected block frames are changed to horizontal writing. Specifically, by clicking the block symbol of the sixth block frame, the attributes can be corrected also at the third and fifth block frames. The other block frames are not changed because they are judged correctly as horizontal writing.

Figure 7:
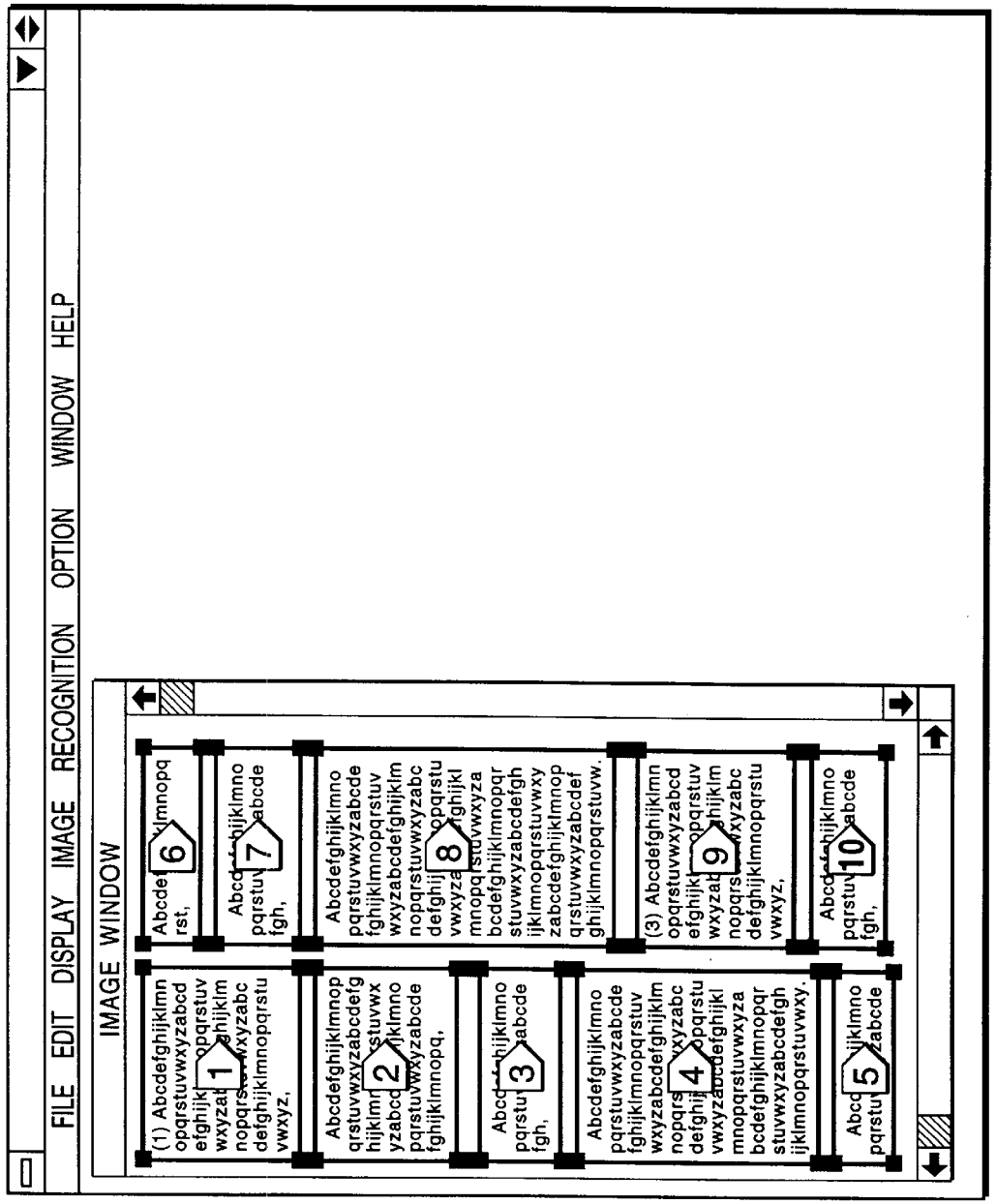
FIG. 7 is a diagram showing a display screen and a menu of the character recognition apparatus of the first embodiment.

After the above designations, the block symbols of all the corrected block frames are displayed at Step S43. The results are shown in FIG. 7 which shows that all the block symbols direct right and indicate horizontal writing.

Accordingly, the attributes of information in a plurality of blocks can be changed or corrected with a small number of operations.

Thereafter, "Recognition" in the menu bar is designated so that the image information in the selected block frames (added with square signs at four corners) as well as the attribute information is transferred to the next stage character recognition process to execute this process. In the character recognition process, character images in the selected block frames are received starting from the smallest block serial number and are sequentially subjected to the character recognition in accordance with the determined typesetting direction (attribute).

In the above description, although all block frames are selected for changing the attributes, desired block frames may be sequentially selected. For example, if a mouse is used, while pressing the right button (or while pressing a predetermined key on a keyboard), a desired block frame is clicked by using the left button. In this manner, a desired block frame is additionally selected or only a desired block frame or frames can be selected.

Also in the above description, only two states of vertical writing and horizontal writing are used as the attributes of a block frame. Specifically, the symbol in a block frame erroneously judged as vertical writing is simply depressed to unanimously change to horizontal writing. However, if there are three or more types of attributes, the attribute to be changed cannot be unanimously designated. If there are three or more candidates of attributes, a menu window is displayed for selecting one or more candidate attributes in the menu window, when a block frame or frames are selected.

Consider for example the case where an original is a mixture of sentences (characters), photographs, tables, graphic images, and the like and the pentagonal symbol (horizontal and vertical directions) is displayed if it is judged as a character block, a circular symbol is displayed if it is judged as a photograph, and a triangular symbol is displayed if it is judged as a table or graphic image. In this case, if there are several blocks erroneously judged as photographs instead of characters and when the symbol (circular symbol in this case) in one of such blocks is designated, a menu window for selecting one of the character and table—graphic image is displayed and "Character" is designated.

In the case where blocks of characters are erroneously judged as blocks of photograph s and tables—graphic images, an attribute of the "Character" may be automatically given when the block symbol in a block frame to be changed is designated.

Attributes are not limited only to characters, photographs, tables, and graphic images. For example, in the case of characters, in addition to vertical writing and horizontal writing, attributes of Japanese characters and English characters may be used. The method of roughly judging an attribute may use any method.

Obviously, the recognition results may be stored as text data, edited, or printed.

As described so far, according to this embodiment, even if an original has a plurality of small blocks and there are a number of attributes to be corrected, a character recognition apparatus easy to be used by an operator can be realized.

Since all block frames can be selected at the same time, for an original, particularly for an original having a single attribute (e.g., an original only with horizontally written sentences), all attributes can be changed, corrected, or designated collectively with a less number of operations.

At the later stage process for images in block frames with an attribute of tables (inclusive of ruled lines), graphic images, photographs, or the like, attributes of a compression process for storing an image as a file or attributes of a variable multiplication may be used.

In the description of Step S42, an attribute is changed with a mouse. Other means such as a key and a menu may be used so long as they can change an attribute.

In the above description, the block symbol indicating an attribute of a block frame is pentagonal. The shape, position, color, size, and the like of the block symbol may be selected as desired. However, it is preferable that they are discriminable by operators.

As described so far, according to the embodiment, even if an original has a plurality of small blocks and there are a number of attributes to be corrected, each attribute can be corrected easily. Accordingly, in recognizing and correcting a read original document, character recognition easier and more convenient to use can be realized.

In the above embodiment, an original image to be processed is input from an image scanner or the like. This embodiment is applicable to the case where an image is read from a storage medium (e.g., floppy disk) or received via a communication line from other devices. Therefore, the invention is not limited only to the image scanner or the like.

Furthermore, the embodiment is applicable to a single apparatus or a system having a plurality of apparatus, or is reduced in practice by externally supplying the control program to an apparatus or a system. Therefore, the embodiment is readily made applicable to a storage medium storing a program embodying the invention.

(Second Embodiment)

Figure 8:
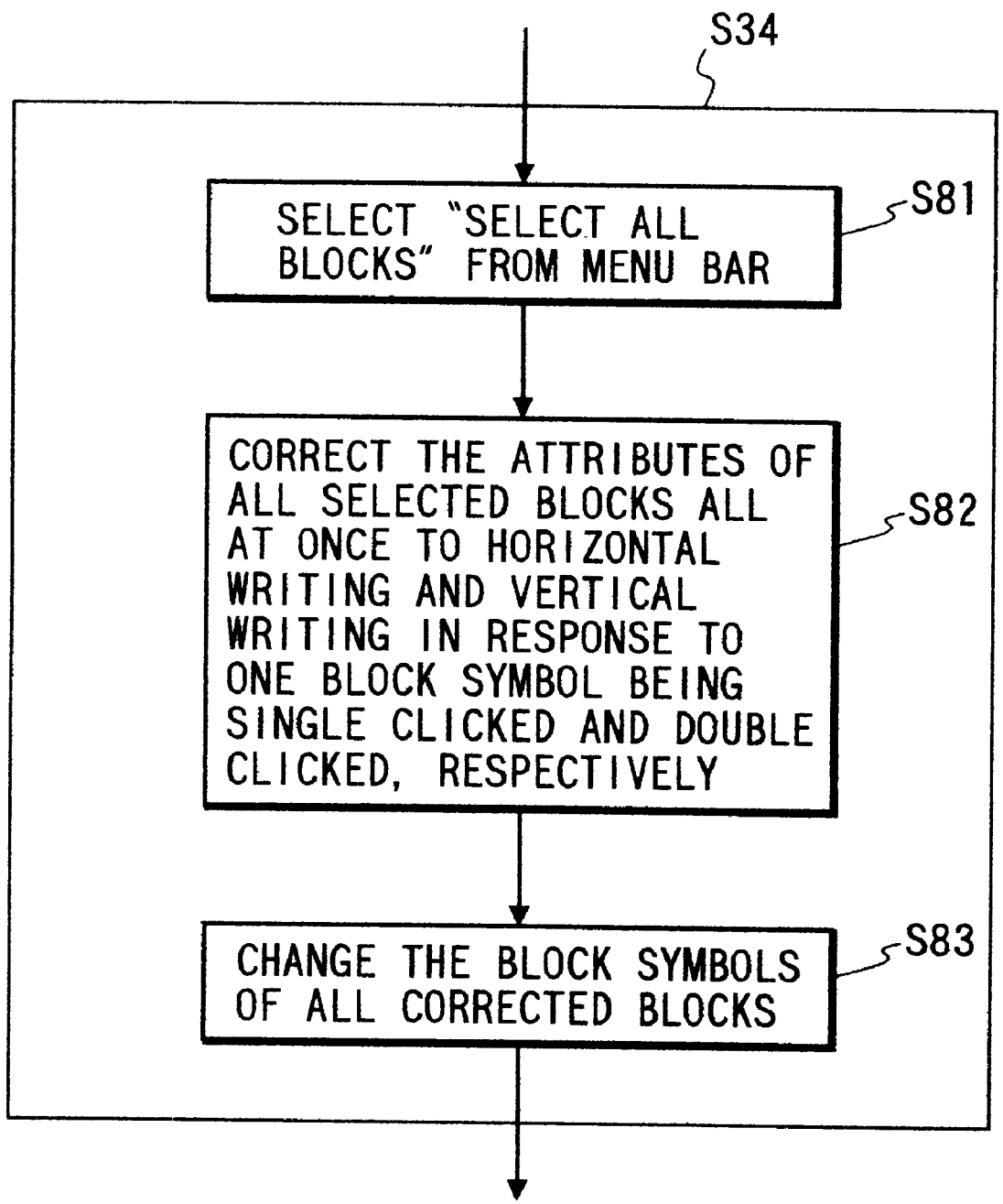
FIG. 8 is a flow chart illustrating the details of Step S34 according to a second embodiment.

FIG. 8 is a flow chart illustrating an attribute correction process at Step S34 according to the second embodiment.

First, at Step S81, a plurality of block frames are selected. In this embodiment, for example, as shown in FIG. 5, an "edit" pull-down menu in a menu bar displayed at the upper portion of the display screen is displayed by manipulating a mouse or the like, and thereafter "Select All Block Frames" is designated so that the attributes of all block frames in the image window can be designated as edit candidates. Grey square signs are formed at the four corners of a selected block frame as shown in FIG. 6 to discriminate between selected and non-selected block frames. In this example, all block frames are selected.

Next, at Step S82, an optional block symbol (not limitative to a symbol block in a selected block frame) among displayed blocks is selected with a mouse and a button of the mouse is depressed once (this operation is called a single click) or twice (this operation is called a double click).

If it is judged that a single click is entered, the selected block frames (in the embodiment, all blocks) are changed to horizontal writing at the same time. If it is judged that a double click is entered, the selected block frames are changed to vertical writing at the same time.

For example, in the example shown in FIG. 6, the third, fifth, and sixth block frames are erroneously judged as vertical writing. In this case, a cursor in cooperation with the mouse is moved to one (sixth block frame in FIG. 6) of the third, fifth, and sixth block frames, and the mouse is clicked once to correct or change all selected block frames to horizontal writing.

After the above designations, the block symbols of all the corrected block frames are displayed at Step S83. In this example, since all the selected blocks are set to horizontal writing, the display results become as shown in FIG. 7 which shows that all the block symbols direct right and indicate horizontal writing.

Accordingly, the attributes of information in a plurality of blocks can be changed or corrected with a small number of operations. Particularly in this embodiment, one of the selected block symbols is single or double clicked without displaying an attribute setting menu or the like. Therefore, the operation can be considerably improved. If a double click is erroneously entered in place of a single click during the attribute change process, the selected blocks are set to vertical writing. However, since this selected state is maintained at this time, a desired block symbol among the selected blocks is again single clicked to set to horizontal writing.

Thereafter, "Recognition" in the menu bar is designated so that the image information in the selected block frames (added with square signs at four corners) as well as the attribute information is transferred to the next stage character recognition process to execute this process. In the character recognition process, character images in the selected block frames are received starting from the smallest block serial number and are sequentially subjected to the character recognition in accordance with the determined typesetting direction (attribute).

In the above description, although all block frames are selected for changing the attributes, desired block frames may be sequentially selected. For example, if a mouse is used, while pressing the right button (or while pressing a predetermined key on a keyboard), a desired block frame is clicked by using the left button. In this manner, the single click and double click of this embodiment can be discriminated from the above operations and a desired block frame is additionally selected or only a desired block frame or frames can be selected.

Also in the above description, only two states of vertical writing and horizontal writing are used as the attributes of a block frame. Specifically, the symbol in a block frame erroneously judged as vertical writing is simply depressed to unanimously change to horizontal writing. However, if there are three or more types of attributes, the attribute to be changed cannot be unanimously designated. If there are three or more candidates of attributes, as the mouse operation, any one of a single click, a double click, or a triple click may be used. In some case, a combination of a specific key on a keyboard may be used.

Consider for example the case where an original is a mixture of sentences (characters), photographs, tables, graphic images, and the like and the pentagonal symbol (horizontal and vertical directions) is displayed if it is judged as a character block, a circular symbol is displayed if it is judged as a photograph, and a triangular symbol is displayed if it is judged as a table or graphic image. In this case, if there are several blocks erroneously judged as photographs instead of characters, a desired block symbol is selected from the erroneously judged blocks and a single click is entered while designating horizontal writing (e.g., by pressing a space key on a keyboard). In this manner, the erroneously judged blocks can be corrected to have an attribute of horizontal writing.

Since all block frames can be selected at the same time, for an original, particularly for an original having a single attribute (e.g., an original only with horizontally written sentences), all attributes can be changed, corrected, or designated collectively with a single operation (in the case of a mouse, a single click or a double click, or a mouse operation while depressing a specific key of a keyboard).

Settings by a mouse or keyboard, or the display type of a block symbol (position, shape, color, size, and so on) may not be determined definitely in advance, but such process environments may be set as desired by an operator.

For example, all block selection, horizontal writing text, vertical writing text, line drawing such as table and graphic image, image such as photograph, or the like may be set as a default value, and an operator determines settings of a keyboard, mouse, or the like and stores the settings in a non-volatile storage medium (e.g., hard disk). In this manner, the process environments are maintained the same each time an operator uses the apparatus and makes it easy to use. If the apparatus is used by a plurality of operators, each operator may store different process environments, and when the apparatus is used, a user name and a password are entered. Alternatively, default process environments may be set for third persons.

Many types of block symbols may be registered in advance to assign a desired one to each attribute.

(Third Embodiment)

Figure 9:
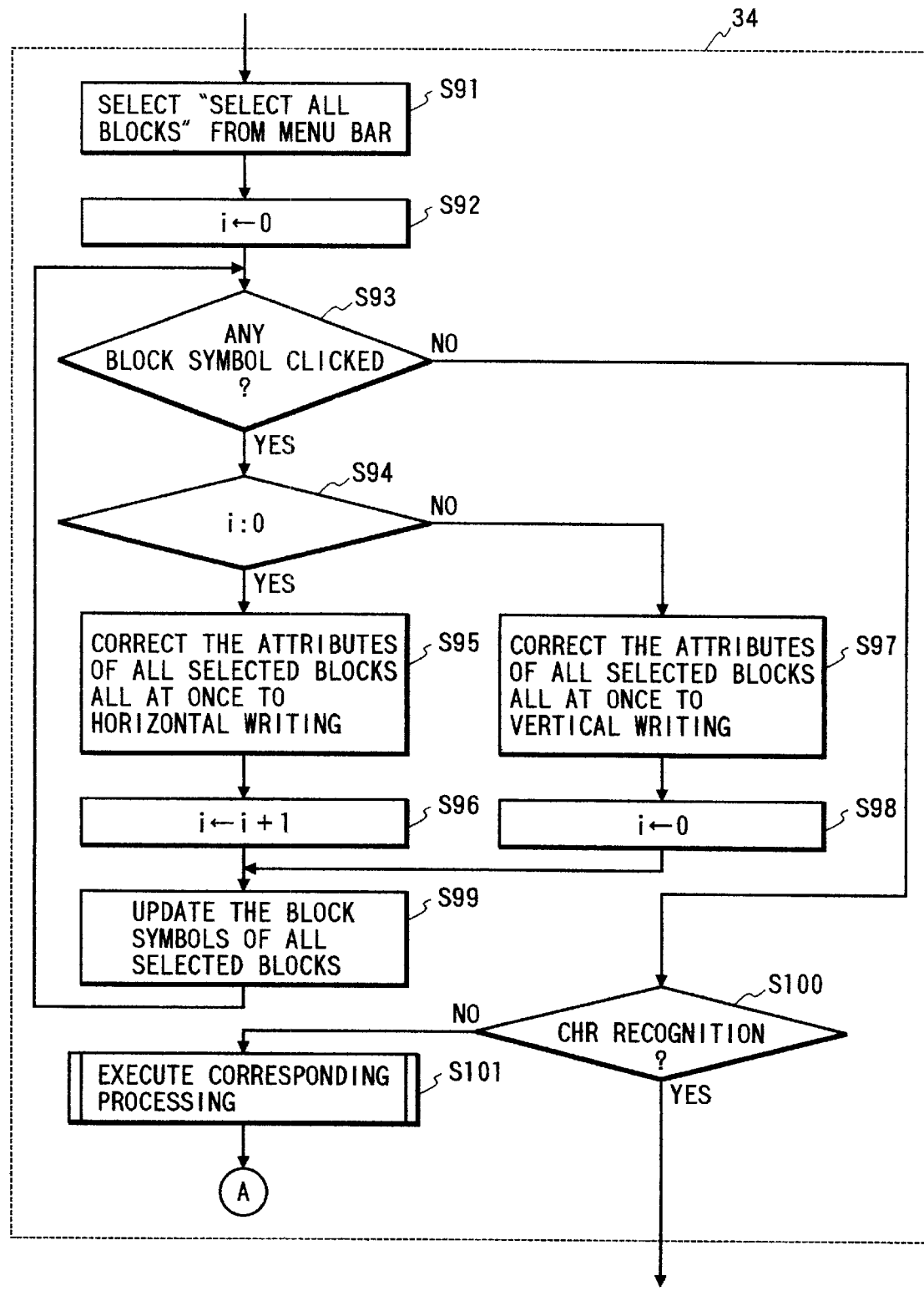
FIG. 9 is a flow chart illustrating the details of Step S34 according to a third embodiment.

FIG. 9 is a flow chart illustrating an attribute correction process at Step S34 according to the second embodiment.

First, at Step S91, a plurality of block frames are selected. In this embodiment, for example, as shown in FIG. 5, an "edit" pull-down menu in a menu bar displayed at the upper portion of the display screen is displayed by manipulating a pointing device or a mouse, and thereafter "Select All Block Frames" is designated so that the attributes of all block frames in the image window can be designated as edit candidates. Grey square signs are formed at the four corners of a selected block frame as shown in FIG. 6 to discriminate between selected and non-selected block frames. In this example, all block frames are selected.

Next, at Step S92, an initial value "0" is stored as a variable i reserved in the memory 5.

At Step S93, it is checked whether a cursor in cooperation with a mouse is positioned on one of displayed block symbols and the button is clicked once.

Upon detection of a click on the block symbol, the flow advances to Step S94 whereat it is checked whether the variable i is "0". FIG. 6 shows the cursor in cooperation with the mouse is pointed to one block symbol.

If the variable i is "0", the flow advances to Step S95 whereat the attributes of all the selected blocks (in this example, all blocks) are changed at the same time to horizontal writing.

Next, at Step S96, the variable i is incremented by "1" and the flow advances to Step S99.

At Step S99, the block symbol display of the selected blocks is changed in accordance with the corrected attribute. The results are shown in FIG. 7. Thereafter, the process returns to Step S93.

If it is judged at Step S94 that the variable i is not "0", the process advances to Step S97.

At Step S97, the attributes of all the selected block frames (in this case, all block frames) are corrected to vertical writing at the same time to thereafter advance to Step S99 whereat the block symbols of the selected block frames are changed to vertical writing.

Accordingly, by clicking the block symbol, the block symbols of all the selected blocks are sequentially changed in the order of horizontal writing, vertical writing, horizontal writing, and so on, and a user can visually confirm a change in the block symbol display.

If a click on a block symbol is not detected, the process advances from Step S94 to Step S100 whereat it is checked whether there is a character recognition instruction. This character recognition instruction is judged from whether "Recognition" on the menu bar displayed at the upper portion of the display screen such as shown in FIG. 5 has been designated. If an instruction other then "Recognition" is clicked, a corresponding process is executed at Step S101 to thereafter repeat the processes from Step S93. If there is a recognition instruction, Step S35 of FIG. 3 is executed to advance to Step S36.

Specifically, the image information in the selected block frames (added with square signs at four corners) as well as the attribute information is transferred to the next stage character recognition process to execute this process. In the character recognition process, character images in the selected block frames are received starting from the smallest block serial number and are sequentially subjected to the character recognition in accordance with the determined typesetting direction (attribute).

Accordingly, the attributes of information in a plurality of blocks can be changed or corrected with a small number of operations. Particularly in this embodiment, one of the selected block symbols is single clicked without displaying an attribute setting menu or the like. By repeating this single click, a change in the attribute of a selected block can be visually confirmed. If the attribute of a selected block is to be changed to vertical writing, the mouse is double clicked twice.

In many cases, a sentence is generally horizontal writing. In this context, the initial setting for attribute change is horizontal writing in this embodiment. For the business work frequently recognizing vertical writing texts, double clicks are required. Therefore, the order of attribute change is preferably set by a user as desired. The attribute change may be stored in a non-volatile memory (e.g., hard disc) so that environments suitable for particular business work and easy to use can be maintained unless otherwise specifically instructed.

In the above description, although all block frames are selected for changing the attributes, desired block frames may be sequentially selected. For example, if a mouse is used, while pressing the right button (or while pressing a predetermined key on a keyboard), a desired block frame is clicked by using the left button. In this manner, the single click and double click of this embodiment can be discriminated from the above operations and a desired block frame is additionally selected or only a desired block frame or frames can be selected.

According to this embodiment, all block frames can be selected at the same time. Therefore, for an original with a single attribute (e.g., originals only with horizontal writing texts), the attribute of all block frames can be corrected or designated at the same time with a simple operation (click in the case of a mouse).

In the description of this embodiment, attributes, for example, five attributes, are cyclically changed with a click. The embodiment is not limited thereto.

Various types of change in attributes may be possible. For example, attributes may be cyclically changed from table, to graphic image, to photograph, to table, and so on by clicking a block symbol while depressing a shift key of a keyboard, or from English, to Japanese (vertical writing), to Japanese (horizontal writing), to English, and so on by clicking a block symbol while depressing a control key of a keyboard.

Settings by a mouse or keyboard, or the display type of a block symbol (position, shape, color, size, and so on) may not be determined definitely in advance, but such process environments may be set as desired by an operator. The set process environments are stored in a non-volatile storage medium (e.g., hard disk). In this manner, the process environments are maintained the same each time an operator uses the apparatus and makes it easy to use. If the apparatus is used by a plurality of operators, each operator may store different process environments, and when the apparatus is used, a user name and a password are entered. Alternatively, default process environments may be set for third persons.

What is claimed is:

1. An image processing apparatus comprising:

image input means for inputting image information;

display control means for controlling a display unit to display the image information input by said image input means together with a plurality of frames indicating respective blocks of the input image information, and to display, on a per block basis, a plurality of patterns indicating respective attributes of the blocks;

selection means for selecting a number of blocks from the plurality of blocks displayed on the display unit;

attribute changing means for changing the attribute of one of the selected blocks in response to a user designation of the displayed pattern for the one of the selected blocks; and attribute setting means for setting the attribute of the block changed by said attribute changing means to the selected blocks and the attribute setting means changes the displayed patterns to the pattern indicating the set attribute for the number of blocks selected by said selection means.

2. An image processing apparatus according to claim 1, wherein said selection means selects all blocks at the same time.

3. An image processing apparatus according to claim 1, wherein the block information and attribute information set by said attribute means is passed to a character recognition process.

4. An image processing apparatus according to claim 1, wherein said attribute is information indicating a direction of character images.

5. An image processing apparatus according to claim 1, wherein said image input means is a scanner.

6. An image processing apparatus according to claim 1, wherein said user designation is performed by a pointing device.

7. An image processing apparatus according to claim 1, wherein said attribute changing means changes the attribute of the one of the selected blocks in response to the number of operations of the same kind.

8. An image processing apparatus according to claim 1, wherein said attribute changing means changes the attribute in a predetermined order in response to user designation of the displayed pattern for one of the selected blocks.

9. An apparatus according to claim 1, further comprising memory means for storing the image information input by said image input means and block data contained in the input image information.

10. An apparatus according to claim 1, further comprising dividing means for dividing the image information input by said image input means into the blocks.

11. An image apparatus according to claim 1, wherein said attribute changing means changes one attribute to another in a plurality of attributes in response to the user designation.

12. An image processing method comprising:

an image input step of inputting image information;

a display control step for controlling a display unit to display the image information input by said image input step together with a plurality of frames indicating respective blocks of the input image information, and to display, on a per block basis, a plurality of patterns indicating respective attributes of the blocks;

a selecting step of selecting a number of blocks from the plurality of blocks displayed on the display unit;

an attribute changing step of changing the attribute of one of the selected blocks in response to a user designation of the displayed pattern for the one of the selected blocks; and an attribute setting step of setting the attribute of the block changed by said attribute changing step to the selected blocks and the attribute setting step changes the displayed patterns to the pattern indicating the set attribute for the number of blocks selected by said selecting step.

13. An image processing method according to claim 12, wherein said selection step selects all blocks at the same time.

14. An image processing method according to claim 12, wherein the block information and attribute information stored at said control step is passed to a character recognition process.

15. An image processing method according to claim 12, wherein said attribute is information indicating a direction of character images.

16. An image processing method according to claim 12, wherein said image input step inputs image information with a scanner.

17. An image processing method according to claim 12, wherein said designating step designates by using a pointing device.

18. An image processing method according to claim 12, wherein said pattern designating step designates a plurality of attributes by the number of operations of the same kind.

19. A method according to claim 12, wherein said pattern designating step comprises changing an attribute designated in a predetermined order of attribute type each time an attribute change instruction is received.

20. A method according to claim 12, further comprising a memory for storing the image information input by said image input step and block data contained in the input image information.

21. A method according to claim 12, further comprising a dividing step for dividing the image information input by said image input step into the blocks.

22. A method according to claim 12, wherein said pattern designating step designates the attribute by changing one attribute to another in a plurality of attributes for each designation operation.

23. A computer program including processor implementable steps for performing all the steps of a method according to any one of claims 12–19 and 20–22.

24. A storage device storing information on an image processing method, the method comprising:

an image input step of inputting image information;

a display control step for controlling a display unit to display the image information input by said image input step together with a plurality of frames indicating respective blocks of the input image information, and to display, on a per block basis, a plurality of patterns indicating respective attributes of the blocks;

a selecting designating step of selecting a number of blocks from the plurality of blocks displayed on the display unit;

an attribute changing step of changing the attribute of one of the selected blocks in response to a user designation of the displayed pattern for the one of the selected blocks; and an attribute setting step of setting the attribute of the block changed by said attribute setting step to the selected blocks and the attribute setting step changes the displayed patterns to the pattern indicating the set attribute for the number of blocks selected by said selecting step.

25. A method according to claim 24, further comprising a memory for storing the image information input by said image input step and block data contained in the input image information.

26. A method according to claim 24, further comprising a dividing step for dividing the image information input by said image input step into the blocks.

27. A method according to claim 24, wherein said pattern designating step designates the attribute by changing one attribute to another in a plurality of attributes for each designation operation.

* * * * *

UNITED STATES PATENT AND TRADEMARK OFFICE
CERTIFICATE OF CORRECTION

PATENT NO.    : 6,504,540 B1                                         Page 1 of 1
DATED         : January 7, 2003
INVENTOR(S)   : Tadanori Nakatsuka It is certified that error appears in the above-identified patent and that said Letters Patent is hereby corrected as shown below:

Column 2,
Line 54, "but" should read -- bus --.

Column 4,
Line 61, "photograph s" should read -- photographs --.

Column 7,
Line 34, "second" should read -- third --.

Column 8,
Line 15, "then" should read -- than --; and
Line 44, "disc)" should read -- disk) --.

Column 9,
Line 45, "attribute means" should read -- attribute setting means --.

Column 10,
Line 62, "claims 12-19 and 20-22." should read -- claims 12-22. --.

Signed and Sealed this

Second Day of September, 2003

JAMES E. ROGAN
*Director of the United States Patent and Trademark Office*